March 10, 1953
O. CAGNOLI
2,630,993
FISHING ROD HOLDER
Filed Sept. 7, 1951
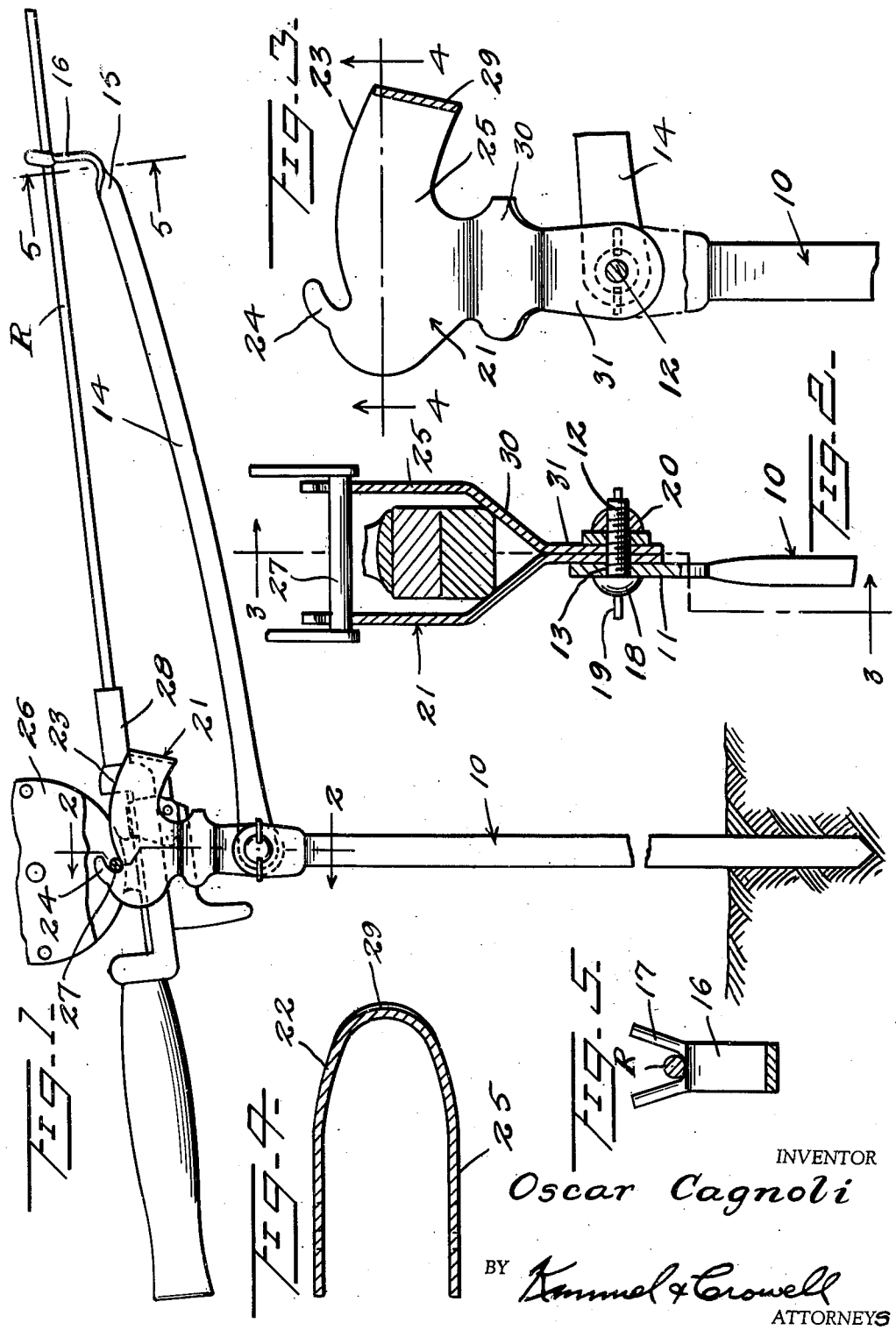
INVENTOR
Oscar Cagnoli
BY Kimmel & Crowell
ATTORNEYS Patented Mar. 10, 1953

2,630,993

UNITED STATES PATENT OFFICE 2,630,993

FISHING ROD HOLDER

Oscar Cagnoli, Hershey, Pa.

Application September 7, 1951, Serial No. 245,448

1 Claim. (Cl. 248—42)

This invention relates to a fishing rod holder, and has as its primary object the provision of an improved structure for holding or supporting a fishing rod or pole in position over a body of water in such manner that the fisherman may be relieved of holding the same.

An additional object of the invention is the provision of such a device which may be adjusted to a variety of angles and positions, whereby to position the fishing rod in a desired location or angular relationship to the surface of a body of water.

Still another object of the invention is the provision of a device of this character which may be readily folded into a small space for packing or transportation.

A still further object of the invention is the provision of a device of the nature which may be readily disassembled for cleaning or the like and reassembled, as desired.

Other objects will in part be obvious and in part be pointed out as the description of the invention proceeds and shown in the accompanying drawing, wherein there is disclosed a preferred embodiment of this inventive concept.

In the drawing—

Figure 1 is a side elevational view of the device of the instant invention shown in association with a fragment of a fishing pole, Figure 2 is a sectional view taken on the line 2—2 of Figure 1, Figure 3 is a sectional view taken on the line 3—3 of Figure 2, Figure 4 is a sectional view taken on the line 4—4 of Figure 3, Figure 5 is a sectional view taken on the line 5—5 of Figure 1.

Referring to the drawing, the numeral 10 designates generally a supporting post or rod which is adapted to be extended into the ground and to be disposed in an upright or vertical position. The post 10 is formed at its upper end with a flattened head 11, having an opening 13 therethrough, and a threaded bolt 12 is extended through the opening 13.

An elongated longitudinally bowed fishing pole supporting bar 14 is mounted at its inner end on the bolt 12, and is formed at its outer end with a twisted portion 15 and a right angular upright support 16 having a fork 17 within which a fishing rod R is adapted to rest. The bolt 12 is provided at one end thereof with a head 18 having wings 19, and a wing nut 20 is threaded onto the bolt 12 and is adapted to hold the supporting bar 14 in adjusted angular position with respect to the post 10.

A rod supporting cradle generally designated as 21 is mounted on the bolt 12 and includes a U-shaped member 22 formed with a convex upper edge 23, and a hook 24 on each side 25 thereof. A reel 26 is adapted to have a lower cross bar 27 engaging with the hook 24, as shown in Figure 1, and the reel supporting bar 28 of the rod R is adapted to rest on the upper edge of the bight portion 29 of the cradle 21.

The opposite sides 25 of the cradle 21 are formed with downwardly convergent extensions 30 which are formed with vertical ears 31 through which the bolt 12 extends. Tightening of the nut 20 on the bolt 12 will hold the cradle 21 in adjusted angular position with respect to the vertical and to the supporting bar 14, and will also hold the supporting bar 14 in adjusted angular position with respect to the post 10.

In the use of this device, the device may be carried in a collapsed condition with the bar 14 disposed alongside the post 10. When the device is to be used for supporting a fishing rod, bar 14 is pulled outwardly and away from the post 10 and the latter is extended in an upright position into the ground. The inclination of the supporting bar 14 will determine the angular position of the fishing rod R, and cradle 21 will be angularly adjusted with the supporting bar 14 so that the reel attaching member 28 of the rod R will snugly rest on the bight 29 of cradle 21 and the lower cross bar 27 of the reel 26 will be hooked into the hook member 24.

I do not mean to confine myself to the exact details of construction herein disclosed, but claim all variations falling within the purview of the appended claim.

What I claim is:

A fishing rod holder comprising an elongated supporting post, an elongated rod supporting bar at the upper end of said post, a clamping bolt adjustably securing the inner end of said bar to the upper end of said post, an extension projecting angularly and upwardly from said bar, a fork carried by said extension and within which an intermediate portion of a fishing rod is adapted to engage, a cradle U-shaped in horizontal cross section, the bight portion of said U forming a stop to limit forward movement of said rod, said cradle being V-shaped in vertical cross section and including a pair of depending lugs having aligned apertures therein, said bolt passing through said apertures for pivotal mounting of said cradle, said cradle being positioned upwardly of the inner end of said bar, and said lugs extending below the upper end of said post and the inner end of said bar, and the upper edges of the legs of said U-shaped cradle having a pair of forwardly directed hooks with which a cross bar of a reel may be engaged for holding the handle portion of the fishing rod against vertical and rearward longitudinal movement of said rod in said cradle.

OSCAR CAGNOLI.

REFERENCES CITED

The following references are of record in the file of this patent:

UNITED STATES PATENTS

| Number | Name | Date |
|---|---|---|
| 1,619,152 | Nunlist | Mar. 1, 1927 |
| 2,311,823 | Gaskill | Feb. 23, 1943 |